(12) United States Patent
Urbach et al.

(10) Patent No.: US 10,385,159 B2
(45) Date of Patent: Aug. 20, 2019

(54) WATER-BASED PRIMER COMPOSITION FOR POLYCARBONATE AND POLYCARBONATE BLENDS

(71) Applicant: SIKA TECHNOLOGY AG, Baar (CH)

(72) Inventors: Dirk Urbach, Ahrensburg (DE); Michael Oeser, Wedel (DE); André Buchholz, Ritterhude (DE); Thomas Hanhörster, Pinneberg (DE)

(73) Assignee: SIKA TECHNOLOGY AG, Baar (CH)

( * ) Notice: Subject to any disclaimer, the term of this patent is extended or adjusted under 35 U.S.C. 154(b) by 170 days.

(21) Appl. No.: 15/549,239

(22) PCT Filed: Feb. 4, 2016

(86) PCT No.: PCT/EP2016/052391
§ 371 (c)(1),
(2) Date: Aug. 7, 2017

(87) PCT Pub. No.: WO2016/124692
PCT Pub. Date: Aug. 11, 2016

(65) Prior Publication Data
US 2018/0016389 A1    Jan. 18, 2018

(30) Foreign Application Priority Data
Feb. 5, 2015    (EP) .................................... 15154022

(51) Int. Cl.
| | |
|---|---|
| *C09J 175/04* | (2006.01) |
| *C09D 175/06* | (2006.01) |
| *C09D 163/00* | (2006.01) |
| *C09D 5/02* | (2006.01) |
| *C08G 59/40* | (2006.01) |
| *C08K 5/00* | (2006.01) |
| *C08K 5/205* | (2006.01) |
| *C08L 33/06* | (2006.01) |
| *C08L 63/00* | (2006.01) |
| *C08L 75/06* | (2006.01) |
| *C09J 11/06* | (2006.01) |
| *B32B 27/26* | (2006.01) |
| *B32B 27/30* | (2006.01) |
| *B32B 27/38* | (2006.01) |
| *B32B 27/40* | (2006.01) |
| *C08G 64/00* | (2006.01) |

(52) U.S. Cl.
CPC ........ *C08G 59/4028* (2013.01); *C08K 5/0025* (2013.01); *C08K 5/205* (2013.01); *C08L 33/066* (2013.01); *C08L 63/00* (2013.01); *C08L 75/06* (2013.01); *C09D 163/00* (2013.01); *C09J 11/06* (2013.01); *C08G 64/00* (2013.01); *C08L 2205/03* (2013.01); *C09J 2463/003* (2013.01); *C09J 2475/003* (2013.01)

(58) Field of Classification Search
None
See application file for complete search history.

(56) References Cited

U.S. PATENT DOCUMENTS

| | | |
|---|---|---|
| 2008/0032055 A1 | 2/2008 | Ogawa et al. |
| 2009/0041943 A1* | 2/2009 | Ogawa .................. B05D 7/572 427/385.5 |

FOREIGN PATENT DOCUMENTS

| | | |
|---|---|---|
| DE | 10350242 A1 | 5/2005 |
| DE | 10 2014 003 777 A1 | 9/2014 |
| JP | 2013-010854 A | 1/2013 |

OTHER PUBLICATIONS

Sep. 14, 2018 Office Action issued in European Patent Application No. 16703517.9.
Mar. 16, 2016 International Search Report issued in International Patent Application No. PCT/EP2016/052391.
Mar. 16, 2016 Written Opinion issued in International Patent Application No. PCT/EP2016/052391.
Ulrich Berges. "Eine Elegante Lösung Bei Spannungsrissen". Anwendungen, Adhäsion, Sep. 2014, pp. 38-42.
Mar. 29, 2019 Office Action issued in Chinese Patent Application No. 201680009036.3.

* cited by examiner

*Primary Examiner* — Michael J Feely
(74) *Attorney, Agent, or Firm* — Oliff PLC

(57) ABSTRACT

A water-based primer composition is particularly suitable for the pre-treatment of polycarbonate substrates, and has a component K1 having an aqueous epoxy resin dispersion, an aqueous polyester-polyurethane dispersion and an aqueous polyacrylate dispersion, and optionally a water-miscible organic solvent, and a second component K2 containing a water-dispersible curing agent based on isocyanate. The primers provide a strong bonding of subsequently applied adhesives to polycarbonate substrates, and permit a processing with a significant reduction in VOC emissions and the prevention of the occurrence of stress-cracks.

15 Claims, No Drawings

WATER-BASED PRIMER COMPOSITION FOR POLYCARBONATE AND POLYCARBONATE BLENDS

TECHNICAL FIELD

The invention pertains to the field of primer compositions and also to the use of primer compositions for the coating and pretreatment of polycarbonate substrates or substrates composed of polycarbonate blends. The present invention further relates to a method for treating polycarbonate substrates and also for adhesively bonding such substrates. In this method the substrate is first coated with a water-based primer composition, to which subsequently an adhesive is applied. Thereafter the substrate coated with adhesive is contacted with a second substrate and bonded.

PRIOR ART

The secure, durable adhesive bonding of components made from polycarbonate or from polycarbonate blends, in the form of polycarbonate/ABS blends, for example, to other substrates generally requires that the substrate be pretreated with suitable primers. Only via coating with such primers is it possible to ensure sufficient strength of an applied adhesive to allow bonding of components, for example, in the automobile industry. Such bonds are required to satisfy particular requirements in order to satisfy the technical aging tests. For example, the bonds must be stable with respect to hot and cold storage, storage under hot and humid conditions, storage under water, and with respect to changes in ambient atmosphere.

Primers employed currently for polycarbonate and for polycarbonate blends are, in particular, solvent borne formulations. Such primers are based, for example on isocyanates as active component, and are available under the trade names Sika Primer 207LUM or Sika Primer 206G+P from Sika. In JP 2013-010854 A, moreover, a primer for polycarbonates is proposed that is based on chlorinated rubber, an ethylene-vinyl acetate copolymer, and solvents, more particularly on the basis of a mixture of alcoholic solvents and aromatic hydrocarbon solvents.

On polycarbonate and polycarbonate blends, however, many of these solvent-based primers lead to problems with stress cracks, which are attributable to the solvents contained in the primers, such as acetone or ethyl acetate, for example. The problem of stress cracks is elucidated at length in U. Berges, Adhäsion, 9/2014, pp. 38 to 42. Stress cracks are generally observed after component tests, and lead to the premature failure of the adhesive bond or to a failure to attain desired strengths.

It has been observed that stress cracks occur especially when a plasticizer-containing adhesive is applied to a coating composed of a solvent-based primer. Given that many moisture-crosslinking, one- and two-component polyurethane adhesives have a certain plasticizer content, such adhesives can be used for the bonding of polycarbonate substrates only with additional measures. For example, DE 10 2014 003 777 A1 proposes eliminating the problem of development of stress cracks by applying two different primers one over the other. A layer of adhesive is then to be applied to this double primer layer. The dual primer coating is intended to ensure that interaction between the substrate and an adhesive applied to the primer, such interaction leading to the development of stress cracks, is reduced.

Even in the primer compositions that are described in DE 10 2014 003 777 A1, however, substantial proportions of organic solvents are employed, particularly in the form of ethyl acetate and methyl ethyl ketone. A consequence of this is that the processing of the primer compositions is accompanied by emissions of organic compounds (VOCs), which have to be captured using technical measures. Furthermore, the need for coating with two primers leads to greater production complexity and cost drawbacks.

There is therefore a need firstly for a primer system which as far as possible contains only small amounts of organic solvents and is largely based on water. Secondly there is a need for a primer system which after application even of only one coat is suitable for minimizing interactions between a plasticizer-containing polyurethane adhesive and solvents from the primer coating and so for effectively suppressing the incidence of stress cracks.

The present invention engages with these tasks.

DESCRIPTION OF THE INVENTION

The object of the present invention in light of the observations above is to provide a water-based primer composition for the coating of substrates made from plastics, especially in the form of polycarbonates or polycarbonate blends, by which deleterious interaction of plasticizers from a subsequently applied adhesive system with the organic solvents used in conventional primer compositions is prevented, so as to suppress, as far as possible completely, any deleterious stress cracking. Such primers ensure that a durable and aging-resistant bond can be assured between components made of polycarbonate or polycarbonate blends and various other substrates. The bonds are to be stable preferably under storage conditions of high atmospheric humidity, underwater storage, storage at elevated temperature, and also storage at high atmospheric humidity and high temperature. Surprisingly it has emerged that a water-based primer composition as claimed in claim 1 is capable of meeting these requirements.

A further aspect of the present invention engages with a method for treating substrates wherein a water-based primer composition as claimed in claim 1 is first mixed, and then is applied to the substrate and dried thereon. Furthermore, the present invention pertains to a method for adhesively bonding two substrates, wherein a water-based primer composition as claimed in claim 1 is first mixed and then applied to a first substrate and dried thereon. Subsequently an adhesive is applied to the dried primer composition, and the adhesive-coated substrate is contacted with a second substrate. A further aspect of the present invention engages, lastly, with the use of water-based primer compositions for the adhesive bonding of plastics substrates using plasticizer-containing polyurethane adhesives, where the mixed primer composition is applied to a plastics substrate.

Some Embodiments of the Invention

In a first aspect, the present invention relates to a water-based primer composition having a first component K1, comprising
- an aqueous epoxy resin dispersion in an amount such that the epoxy resin content of the first component is 15 to 45 wt %,
- an aqueous polyester-polyurethane dispersion in an amount such that the polyester-polyurethane content of the first component is 2 to 12 wt %,
- an aqueous polyacrylate dispersion in an amount such that the polyacrylate content of the first component is 1.5 to 9 wt %, and
- optionally a water-miscible organic solvent in an amount of up to 40 wt %, based on the first component, and a second component K2 comprising a water-dispersible, isocyanate-based crosslinker.

In relation to the solids content of the various dispersions, there are no substantial restrictions on the present invention; the solids content should, however, be selected such that the amounts of the relevant constituents are within the specified ranges. Preferred solids fractions in the respective dispersions are 30 to 70 wt % and more particularly 35 to 60 wt %.

A "primer" in the present document is a composition which is suitable as a preliminary coat and which in addition to nonreacting, volatile substances and optional solid adjuvants includes at least one substance having isocyanate groups and is capable, on application to a substrate, of curing to a solid, adhering film in a coat thickness of typically at least 5 μm. Curing is accomplished on the one hand by the evaporation of the unreactive volatile substances, such as solvents in particular, and also, on the other hand, by the chemical reaction of the isocyanate groups with functional groups in the polymers present in the first component K1, more particularly the polyester polyurethane, this chemical reaction leading to crosslinking, so that a layer applied subsequently, composed in particular of an adhesive or sealant, is able to develop effective adhesion to the substrate.

"Drying" throughout the document refers to the drying-off of an aqueous composition subsequent to its application, with the water and any solvents present undergoing complete or at least predominant evaporation.

The term "polymer" in the present document encompasses on the one hand a collective of chemically uniform macromolecules which nevertheless differ in respect of degree of polymerization, molar mass, and chain length, said collective having been prepared through a polymerization reaction (chain polymerization, polyaddition, polycondensation). The term "on the other hand", also encompasses derivatives of such a collective of macromolecules from polymerization reactions, in other words uses which have been obtained by reactions, such as additions or substitutions, for example, of functional groups on existing macromolecules and which may be chemically uniform or chemically nonuniform. The term "moreover" further embraces what are called prepolymers, these being reactive oligomeric preadducts whose functional groups have participated in the construction of macromolecules.

The term "polyurethane polymer" encompasses the polymers which have been prepared by the process known as isocyanate polyaddition. This also includes polymers which are nearly or entirely free of urethane groups. Examples of polyurethane polymers are polyether-polyurethanes, polyester-polyurethanes, polyether-polyureas, polyureas, polyester-polyureas, polyisocyanates, and polycarbodiimides.

The aqueous epoxy resin dispersion is based more particularly on an epoxy resin which has more than one epoxide group per molecule and is a liquid epoxy resin or a solid epoxy resin. The term "solid epoxy resin" is very well known to the person skilled in the epoxy art, and is used in contrast to "liquid epoxy resins". The glass temperature of solid resins is above room temperature, meaning that they can be comminuted at room temperature to give pourable powders.

Preferred liquid epoxy resins have the formula (I)

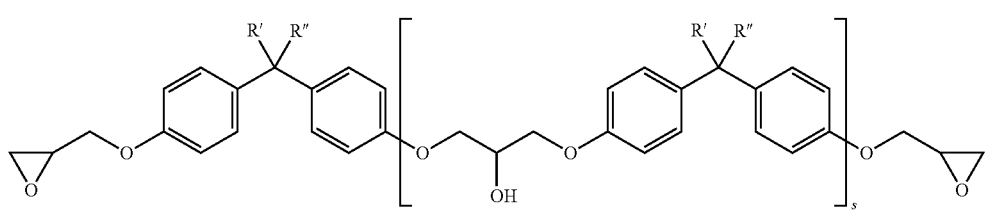

(I)

In this formula, the substituents R' and R" independently of one another are either H or $CH_3$. Furthermore, the index s has a value of 0 to 1. Preferably s has a value of less than 0.2.

Preferred liquid epoxy resins are diglycidyl ethers of bisphenol A (DGEBA), of bisphenol F and also of bisphenol A/F (the designation "A/F" here refers to a mixture of acetone with formaldehyde which is used as a reactant in its preparation). Liquid resins of this kind are available for example as Araldite® GY 250, Araldite® PY 304, Araldite® GY 282 (Huntsman) or D.E.R.™ 331 or D.E.R.™ 330 (Dow), or Epikote 828 (Resolution).

Preferred solid epoxy resins have the formula (II)

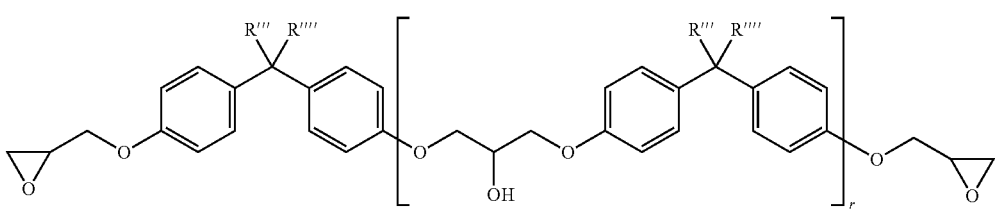

(II)

In this formula, the substituents R''' and R'''' independently of one another are either H or $CH_3$. Furthermore, the index r has a value of >1.5, more particular of 2 to 12.

Solid epoxy resins of this kind are available commercially as pure solids or as aqueous dispersions, from Dow, Huntsman or Resolution, for example.

Particularly preferred as epoxy resin is a solid epoxy resin. Solid epoxy resins have the great advantage over liquid epoxy resins that a two-component or multicomponent aqueous primer composition formulated therewith is tack-free significantly more quickly, this being a key advantage in the context of use as a primer, since it allows the waiting time between application of the primer and application of an adhesive or sealant to the primer to be significantly shortened. Further suitable epoxy resins are, on the one hand, epoxy resins having N-glycidyl groups, such as, for example, of the following three formulae,

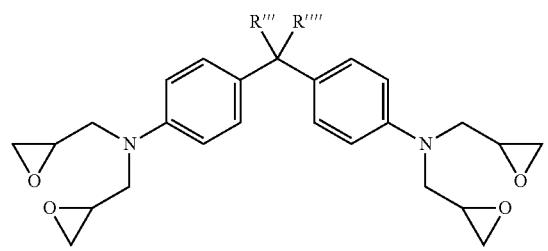

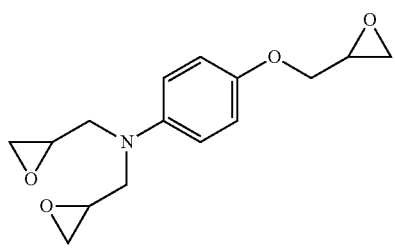

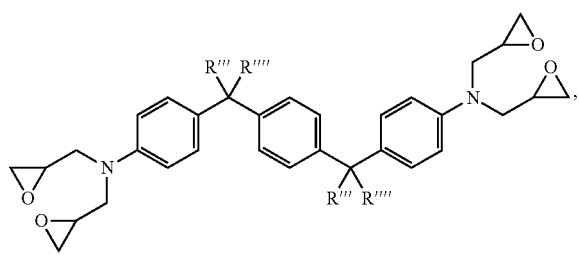

especially of the kind available commercially as Araldite® MY 721, MY 722, MY 720, MY 9512 or MY 510 from Huntsman or Epon HPT 1072 from Shell.

On the other hand, further suitable epoxy resins are those which are based on aliphatic glycidyl ethers, such as, for example, the epoxy resins of the following two formulae

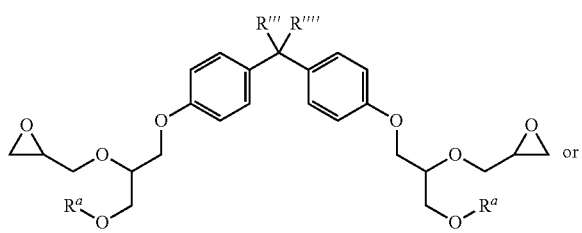

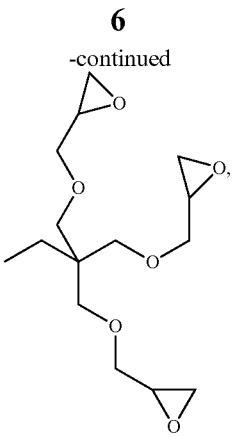

where $R^a$ is a linear or branched alkyl radical, in particular having 4 to 8 carbon atoms.

Furthermore, other suitable epoxy resins are those which have the following formula

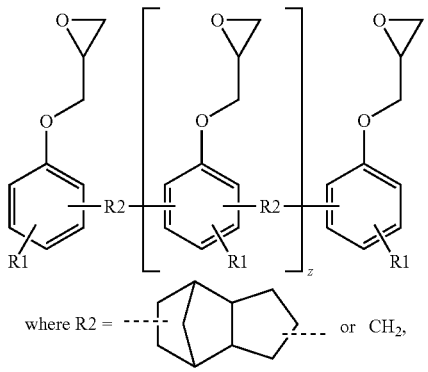

R1=H or methyl, and z=0 to 7.

These are, in particular, phenol- or cresol-novolacs (R2=CH$_2$).

Such epoxy resins are available commercially under the trade name EPN or ECN and also Tactix®556 from Huntsman; various EPN and ECN grades are also offered by Huntsman, for example, as dispersions in water.

Furthermore, other suitable epoxy resins are glycidyl esters, as sold for example as Araldite® PT 910 or PY 184 from Huntsman.

The most suitable epoxy resins have proven to be those having an epoxide equivalent weight (EEW) of at least 1400 g/eq, preferably in the range from 1500 to 3000 g/eq, and more preferably about 1600 to 2500 g/eq. These epoxy resins are preferably bisphenol A/epichlorohydrin-based solid epoxy resins, of the kind sold for example, under the trade name Epirez® 3540 by Momentive Specialty Chemicals Inc.

The fraction of epoxy resin among the weight of the first component K1 is preferably 17 to 35 wt %.

Besides water, the aqueous epoxy resin dispersion may also comprise a fraction of an organic solvent, in the form of 2-propoxyethanol, for example, but as far as possible the amount of such solvents ought not to exceed the amount of water in the epoxy resin dispersion.

The first component, as described above, further comprises an aqueous polyester-polyurethane dispersion, with the polyester-polyurethane preferably being an elastomeric polyester-polyurethane. A suitable polyester-polyurethane is available, for example, under the trade name Emuldur 381A from BASF SE. About 3 to 10 wt %, and more particularly about 3.5 to 9.5 wt %, may be stated as particularly favorable figures for the polyester-polyurethane content of the first component.

As a third essential constituent, the first component comprises an aqueous polyacrylate dispersion in an amount such that the polyacrylate content of the first component is about 1.5 to 9 wt %.

The polyacrylate is preferably a hydroxy-functional polyacrylate. Particularly preferred hydroxy-functional polyacrylates have a hydroxyl number of 125 or more, and more particularly 130 or more. Furthermore, it is preferred if the hydroxyl number of the polyacrylate is not more than 500, and preferably not more than 250.

Suitable polyacrylate dispersions in the context of the present invention are, for example, Macrynal VSM 6299w/42WA from Allnex Belgium SA, Joncryl OH8311 and Luhydran S945T (each from BASF); Macrynal VSM 6299w/42WA affords the best overall properties and is therefore particularly preferred.

With a view to the achievable storage stability and to the applications properties, advantages are associated with a polyacrylate content in the first component of about 1.75 to 8 wt %, and more particularly about 1.85 to 7.5 wt %.

As far as the weight ratio of epoxy resin to the sum of the weight fractions of polyester-polyurethane and polyacrylate in the water-based primer composition is concerned, there are no substantial restrictions. It has nevertheless emerged as useful if this ratio is in the range from about 1.15:1 to 5:1, in other words such that there is a certain excess of epoxy resin over the sum total of the weights of polyester-polyurethane and polyacrylate. It is particularly favorable, furthermore, if the weight ratio of the polyester-polyurethane to the polyacrylate is in the range from about 2:1 to 1:1.

For the purpose of setting a viscosity which is suitable for application, and for improving the wetting properties, the water-based primer composition of the invention may further comprise a water-miscible organic solvent. Water-miscible solvents that are suitable in this context are, in particular, ethers, ketones, esters, and alcohols, which may be used for example in the form of tetrahydrofuran, methyl ethyl ketone, acetone, or acetates, such as methyl acetate, ethyl acetate or butyl acetate. One particularly suitable water-miscible organic solvent is isopropanol.

A preferred content of such water-miscible organic solvents may be stated at about 4 to 40 wt %.

Besides the required constituents already mentioned, the composition of the invention may comprise further additives for the establishment of desired properties. Examples of suitable further constituents in this context are hydroxy-functional solvents, defoamers, thickeners, and wetting agents; however, UV and heat stabilizers, pigments and dyes are also contemplated as additives.

The amount of water in the composition of the invention is generally the balance of the composition to make up 100 wt % in relation to the first component K1.

As its second component, the water-based primer composition comprises a water-dispersible, isocyanate-based crosslinker. There are no substantial restrictions here in relation to the polyisocyanates for use as the isocyanate basis. Particularly suitable polyisocyanates are monomeric di- or triisocyanates or an oligomer of a monomeric diisocyanate, more particularly a biuret or an isocyanurate of a monomeric diisocyanate or triisocyanate.

Especially suitable as polyisocyanate are hexamethylene 1,6-diisocyanate (HDI), 2-methylpentamethylene 1,5-diisocyanate, 2,2,4- and 2,4,4-trimethylhexamethylene 1,6-diisocyanate (TMDI), decamethylene 1,10-diisocyanate, dodecamethylene 1,12-diisocyanate, lysine diisocyanate and lysine ester diisocyanate, cyclohexane 1,3- and 1,4-diisocyanate and any desired mixtures of these isomers, 1-methyl-2,4- and -2,6-diisocyanatocyclohexane and any desired mixtures of these isomers (HTDI or $H_6$TDI), 1-isocyanato-3,3,5-trimethyl-5-isocyanatomethylcyclohexane (i.e. isophorone diisocyanate or IPDI), perhydrodiphenylmethane 2,4'- and 4,4'-diisocyanate (HMDI or $H_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethylxylylene 1,3- and 1,4-diisocyanate (m- and p-TMXDI), bis(1-isocyanato-1-methylethyl)naphthalene, tolylene 2,4- and 2,6-diisocyanate and any desired mixtures of these isomers (TDI), diphenylmethane 4,4'-, 2,4'- and 2,2'-diisocyanate and any desired mixtures of these isomers (MDI), phenylene 1,3- and 1,4-diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODD, dianisidine diisocyanate (DADI), tris(p-isocyanatophenyl) thiophosphate, and also oligomers of the aforesaid isocyanates. Preferred are MDI, TDI, IPDI and tris(p-isocyanatophenyl) thiophosphate. Particularly preferred are TDI, HDI and tris(p-isocyanatophenyl) thiophosphate.

According to one preferred embodiment of the present invention, the water-dispersible, isocyanate-based crosslinker comprises aliphatic polyisocyanates—aliphatic polyisocyanates which can be used are, in particular, hexamethylene diisocyanate or isophorone diisocyanate. The most suitable in the context of the present invention is an aliphatic polyisocyanate in the form of hexamethylene diisocyanate.

Other suitable isocyanate-based crosslinkers are isocyanate-group-containing adducts of a least one polyol and at least one monomeric diisocyanate or triisocyanate, especially the monomeric diisocyanates or triisocyanates recited in detail in the section above. Such adducts are more particularly those with polyols having a molecular weight of less than 1000 g/mol, preferably less than 600 g/mol.

Especially suitable as polyol for such adducts are the following:

polyether polyols, also called polyoxyalkylene polyols, which are polymerization products of ethylene oxide, propylene 1,2-oxide, butylene 1,2- or 2,3-oxide, oxetane, tetrahydrofuran or mixtures thereof, polymerized where appropriate by means of a starter molecule having two or more active hydrogen atoms, such as, for example, water, ammonia or compounds having two or more OH or NH groups, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the aforementioned compounds. It is possible to use not only polyoxyalkylene polyols having a low degree of unsaturation (measured according to ASTM D-2849-69 and reported in milliequivalents of unsaturation per gram of polyol (meq/g)), produced for example using Double Metal Cyanide Complex catalysts (DMC catalysts), but also polyoxyalkylene polyols having a higher degree of unsaturation, produced for example using anionic catalysts, such as NaOH, KOH, CsOH or alkali metal alkoxides. Particularly suitable polyether polyols are polyoxyalkylene diols and triols, especially polyoxyalkylene diols. Particularly suitable polyoxyalkylene diols and -triols are polyoxyethylene diols and triols and also polyoxypropylene diols and triols. Likewise particularly suitable are what are called ethylene oxide-terminated ("EO-endcapped", ethylene oxide-endcapped), polyoxypropylene polyols. The latter are special polyoxypropylene-polyoxyethylene polyols which are obtained, for example, by subjecting pure polyoxypropylene polyols, especially polyoxypropylene diols and triols, to further alkoxylation with ethylene oxide after the end of the polypropoxylation reaction; as a result, they have primary hydroxyl groups.

Polyester polyols which carry at least two hydroxyl groups, which are prepared by known methods, particularly by polycondensation of hydroxycarboxylic acids or lactones, or by polycondensation of aliphatic and/or aromatic polycarboxylic acids with dihydric or polyhydric alcohols.

Especially suitable are polyester polyols prepared from di- to trihydric, especially dihydric, alcohols, such as, for example, ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (dimer diol), hydroxypivalic acid neopentyl glycol ester, glycerol, 1,1,1-trimethylolpropane, or mixtures of the aforesaid alcohols, with organic dicarboxylic or tricarboxylic acids, especially dicarboxylic acids, or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid, and trimellitic anhydride, or mixtures of the aforesaid acids; and also polyester polyols formed from ε-caprolactam and starters, such as the aforementioned dihydric or trihydric alcohols.

Particularly suitable polyester polyols are polyester diols. Especially suitable polyester diols are those prepared from adipic acid, azelaic acid, sebacic acid, dodecanedicarboxylic acid, dimer fatty acid, phthalic acid, isophthalic acid, and terephthalic acid as dicarboxylic acid and from ethylene glycol, diethylene glycol, neopentyl glycol, 1,4-butanediol, 1,6-hexanediol, dimer fatty acid diol, and 1,4-cyclohexanedimethanol as dihydric alcohol. Especially suitable also are polyester diols prepared from ε-caprolactone and one of the aforementioned dihydric alcohols as starters.

Polycarbonate polyols of the kind obtainable through polycondensation, for example, of the abovementioned dihydric or trihydric alcohols,—those used for the synthesis of polyester polyols—with dialkyl carbonates, such as dimethyl carbonate, diaryl carbonates, such as diphenyl carbonate, or phosgene. Particularly suitable are polycarbonate diols, especially amorphous polycarbonate diols.

Block copolymers carrying at least two hydroxyl groups, and having at least two different blocks with polyether, polyester and/or polycarbonate structure of the type described above.

Dihydric or polyhydric alcohols of low molecular mass, such as, for example, 1,2-ethane diol, 1,2- and 1,3-propanediol, neopentyl glycol, diethylene glycol, triethylene glycol, the isomeric dipropylene glycols and tripropylene glycols, the isomeric butane diols, pentane diols, hexane diols, heptane diols, octane diols, nonane diols, decanediols, undecanediols, 1,3- and 1,4-cyclohexanedimethanol, hydrogenated bisphenol A, dimeric fatty alcohols, 1,1,1 trimethylolethane, 1,1,1 trimethylolpropane, glycerol, pentaerythritol, sugar alcohols, such as xylitol, sorbitol or mannitol, sugars, such as sucrose, and low molecular mass alkoxylation products of the aforesaid dihydric and polyhydric alcohols.

Particularly preferred for use as polyols are propylene carbonates and polyethylene glycols, and as polyisocyanate hexamethylene diisocyanate, which may have been isocyanuratized and/or allophanate-modified.

Additionally to the water-dispersible, isocyanate-based crosslinkers, it is also possible to employ aziridine-based crosslinkers as a constituent of the second component. Examples of preferred compounds in this context are trimethylolpropane tris((2-methyl)aziridin-1-yl)propionate, trimethylolpropane tris-3-(aziridin-1-yl)propionate, and pentaerithrol tris-3-(aziridin-1-yl)propionate. Compounds of this kind are available for example under the trade names Xama° 2, Xama® 7 and Xama® 200 from Biomaterial Science LLC, USA, or under the trade name Chemitite® PZ from Nippon Shokubai Co. Ltd., Japan. Since, however, these crosslinkers have emerged as being less effective in the context of the experiments conducted, the fraction of the isocyanate-based crosslinkers ought to make up at least 50 wt %, more particularly at least 75 wt %, and very preferably at least 90 wt %, based on the total weight of the second component K2.

The water-dispersible, isocyanate-based crosslinker is usefully to be incorporated into the water-based primer composition in an amount such that the fraction of the isocyanate groups from the crosslinker exceeds the total amount of the functional groups from the epoxy resin, the polyester-polyurethane, and the polyacrylate. Suitable amounts of water-dispersible crosslinker are generally 5 to 10 wt % and more particularly 8 to 10 wt %, based on the total weight of the first component K1.

In one especially preferred embodiment, the water-based primer composition of the invention consists of a first component consisting of
   about 17 to 35 wt % of epoxy resin having an epoxy equivalent weight in the range from 1500 to 2500 g/eq,
   about 3 to 10 wt % of an elastic polyester-polyurethane,
   about 1.75 to 8 wt % of a hydroxy-functional polyacrylate having a hydroxyl number of 130 or more,
   isopropanol and water as solvents, in the balance to 100 wt % of the first component K1,
and also a second component K2 consisting of 5 to 10 wt % of an isocyanate crosslinker based on isocyanuratized hexamethylene diisocyanate, formulated with propylene carbonate and polyethylene glycol.

According to a further aspect, the present invention relates to a method for treating a substrate S1, comprising the steps of
   (i) mixing the components of a water-based primer composition as has been described above,
   (ii) applying the mixed primer composition to a substrate S1, and
   (iii) allowing the applied composition to dry.

The primer described above may be applied in a variety of ways. Hence it is possible for the water-based primer composition of the invention to be applied to the substrate by means of a spraying, spreading, knife coating, die application, roll application or casting application method. Application is typically carried out by means of an applicator unit.

The substrate S1 is preferably a plastics substrate. Plastics substrates are understood in particular to be flexible sheet-like plastics in a thickness of 0.05 mm to 5 mm. The plastic is preferably a polycarbonate or a polycarbonate blend, in the form of polycarbonate/ABS, for example.

After the composition has been mixed and applied it is dried, thus forming a dried, water-based primer composition which forms a film. This film is referred to as primer. Drying may take place by evaporation in air with and without drying means. Serving as drying means for example may be a blower, more particularly an air blower.

A drying means is preferably used. Drying may take place at room temperature or at elevated temperature, more particularly at a temperature of 60° C. With preference the drying takes place at low temperatures, by means of a Carnot process, for example.

A feature of the primer-coated substrates produced is that an adhesive applied subsequently to the primer is able to enter into a firmly adhering assembly with the primer and with the substrate, thus enabling a highly durable adhesive bond to further substrates. A further aspect of the present invention therefore relates to a method for adhesively bonding two substrates S1 and S2, which comprises the steps of
(i) mixing the components of a water-based polyurethane composition as described above,
(ii) applying the mixed composition to a first substrate S1,
(iii) allowing the applied composition to dry,
(iv) applying an adhesive to the dried composition, and
(v) contacting the adhesive-coated substrate S1 with a second substrate S2.

With regard to the first substrate S1, preferred substrates are those as stated above for the method for treating a substrate S1. With regard to the second substrate S2, it may likewise be a plastics substrate, especially in the form of polycarbonate or polycarbonate blend substrate, but alternatively it may be a substrate made from another material, being made of metal, for example, or a substrate based on glass or a glass-ceramic.

The adhesive in step (iv) may be applied, for example, by a spraying, spreading, knife coating, die application, roll application or casting application process. It is nevertheless preferred for it to be applied as a bead of adhesive from cartridge guns or machine applicator systems.

Contacting is done usefully during the open time of the adhesive. In one preferred embodiment, the step of contacting (v) takes place under an applied pressure exerted on the substrate S1, thereby achieving sufficient wetting of both substrates and a structurally desirable, i.e., dimensionally stable, form.

The adhesive to be incorporated into the method described is preferably a polyurethane adhesive and with particular usefulness is a plasticizer-containing polyurethane adhesive, since the advantages imparted by the primers of the invention are manifested to their most pronounced extent when such an adhesive is employed. As a suitable commercially available adhesive it is possible for example to use Sikaflex® 254.

A further aspect of the present invention relates, finally, to the use of a water-based primer composition as has been described above as primer for the adhesive bonding of plastics substrates, wherein the mixed primer composition is applied to a plastics substrate. The plastics substrate is preferably a substrate based on polycarbonate or on a polycarbonate blend, whereas the adhesive to be used for bonding is usefully a polyurethane adhesive and more particularly is a plasticizer-containing polyurethane adhesive.

EXAMPLES

The examples given below serve for illustration of the invention.

For the following tests, the primer compositions indicated in table 1 were mixed, in the ratio desired in each case, with the crosslinker component, and the mixture was applied within the pot life in a thin film to a polycarbonate substrate. The primer layer was made dry either at room temperature (23° C.) or at elevated temperature. After it had been made completely dry, a bead of adhesive based on the polyurethane adhesive Sikaflex® 254 was applied and curing took place at room temperature for seven days. The sample specimens thus obtained were each investigated successively under different climatic conditions by means of peel tests:
1. curing and storage of the bonded components at room temperature at 23° C./50% relative humidity for seven days,
2. seven days of water storage in mains water at 23° C.,
3. 24 h of storage at 80° C.,
4. seven days of "heat and humidity" testing (hot and humid storage at 100% relative humidity and 70° C., seven days and 24 h at −30° C., DIN ISO 9142),
5. 24 h, 100° C.

After each of the test cycles, the adhesion of the adhesive was assessed manually by partial cutting and subsequent peeling. The adhesion and the aspect at fracture were assessed by experienced testers, without determination of peel values on tensile testing machines. In all cases, the aspect at fracture observed using the primer of the invention was cohesive.

Materials Used:

| | |
|---|---|
| EPI-REZ Resin 3540 WY-55 | Epoxy resin dispersion, 55% solids content, based on EPON Resin 1007F in water and 2-propoxyethanol |
| Waterpoxy 1422 | Epoxy resin dispersion, 54% solids content |
| Emuldur 381 A | Polyester-polyurethane dispersion, 40% solids content |
| MACRYNAL VSM 6299w/42WA | Hydroxy-functional acrylate dispersion, about 42% solids content, hydroxyl number 135 |
| Joncryl 8311 | Hydroxy-functional acrylate dispersion, about 42% solids content, hydroxyl number 120 |
| Luhydran S945T | Hydroxy-functional dispersion, about 45% solids content, hydroxyl number 100 |
| Crosslinker 1 | Water-dispersible isocyanate crosslinker based on isocyanuratized hexamethylene diisocyanate, formulated with propylene carbonate and polyethylene glycol |
| Crosslinker 2 | Water-dispersible isocyanate crosslinker based on isocyanuratized hexamethylene diisocyanate (partly allophanate-modified), formulated with propylene carbonate and polyethylene glycol |
| XAMA 200 | Trifunctional aziridine |

TABLE 1

|  | SC [%] | 1 | 2 | 3 | 4 | 5 | 6 | 7 | 8 | 9 |
|---|---|---|---|---|---|---|---|---|---|---|
| Component 1 | | | | | | | | | | |
| Epirez 3540 | 54.5 | 36.4 | 43.6 | 50 | 32.7 | | 47.1 | 61.1 | 38.5 | 43.5 |
| Waterpoxy 1422 | 55 | | | | | 36.4 | | | | |
| Emuldur 381 A | 40 | 18.2 | 9.1 | 9.1 | 16.4 | 18.2 | 23.5 | 11.1 | 17.3 | 10.9 |
| Macrylnal VSM6299W | 42 | 9.1 | 10.9 | 4.5 | 14.5 | 9.1 | 11.8 | 5.6 | 15.4 | 17.4 |
| Joncryl OH 8311 | 42 | | | | | | | | | |
| Luhydran S945T | 40 | | | | | | | | | |
| Isopropanol | | 25.5 | 25.5 | 25.5 | 25.5 | 25.5 | 4.1 | 7.8 | 10.8 | 7.6 |
| Water | | 10.9 | 10.9 | 10.9 | 10.9 | 10.9 | 13.6 | 14.4 | 18.1 | 20.7 |
| Component 2 | | | | | | | | | | |
| Crosslinker 2 | | 8.0 | 8.0 | 8.0 | 8.0 | 8.0 | | | | |
| Crosslinker 1 | | | | | | | 10.0 | 10.0 | 10.0 | 10.0 |
| Xama 200 | | | | | | | | | | |
| Storage | | | | | | | | | | |
| RT | | i.O. | i.O. | i.O. | i.O. | i.O. | i.O. | i.O. | i.O. | i.O. |
| Water | | 98% | i.O. | i.O. | i.O. | i.O. | i.O. | i.O. | i.O. | i.O. |
| 24 h 80° C. | | i.O. | i.O. | i.O. | i.O. | i.O. | i.O. | i.O. | i.O. | i.O. |
| H&H | | i.O. | i.O. | i.O. | i.O. | n.i.O. | i.O. | i.O. | i.O. | i.O. |
| 100° C. | | i.O. | i.O. | i.O. | i.O. | i.O. | i.O. | i.O. | i.O. | i.O. |

SC = Solids content;
98% = slight detachments after water storage (98% i.O.);
i.O. = satisfactory;
n.i.O. = unsatisfactory

TABLE 2

|  | SC [%] | V1 | V2 | V3 | V4 | V5 | V6 |
|---|---|---|---|---|---|---|---|
| Component 1 | | | | | | | |
| Epirez 3540 | 54.5 | 31.3 | 40 | 16.7 | 16.7 | 49.5 | 66.0 |
| Waterpoxy 1422 | 55 | | | | | | |
| Emuldur 381 A | 40 | 62.5 | 60 | 16.7 | 66.7 | 16.5 | 16.5 |
| Macrylnal VSM6299W | 42 | | | 66.7 | 16.7 | | |
| Joncryl OH 8311 | 42 | | | | | 33.0 | |
| Luhydran S945T | 40 | | | | | | 16.5 |
| Isopropanol | | 6.3 | | | | | |
| Diisononylphthalate | | | | | | 1.0 | 1.0 |
| Component 2 | | | | | | | |
| Crosslinker 2 | | 6.0 | 6.0 | 6.0 | 6.0 | | |
| Crosslinker 1 | | | | | | | |
| Xama 200 | | | | | | 2.0 | 2.0 |
| Storage | | | | | | | |
| RT | | n.i.O. | n.i.O. | i.O. | n.i.O. | n.i.O. | i.O. |
| Water | | n.i.O. | n.i.O. | i.O. | n.i.O. | n.i.O. | i.O. |
| 24 h 80° C. | | n.i.O. | n.i.O. | n.b. | n.i.O. | n.i.O. | i.O. |
| H&H | | n.i.O. | n.i.O. | n.b. | n.i.O. | n.i.O. | n.i.O. |
| 100° C. | | n.i.O. | n.i.O. | n.i.O. | n.i.O. | n.i.O. | n.b. | i.O. = satisfactory;
n.i.O. = unsatisfactory;
n.b. = not determined

The invention claimed is:

1. A water-based primer composition having
   a first component K1 comprising
   an aqueous epoxy resin dispersion in an amount such that the epoxy resin content of the first component is 15 to 45 wt %,
   an aqueous polyester-polyurethane dispersion in an amount such that the polyester-polyurethane content of the first component is 2 to 12 wt %,
   an aqueous polyacrylate dispersion in an amount such that the polyacrylate content of the first component is 1.5 to 9 wt %, and
   optionally a water-miscible organic solvent in an amount of up to 40 wt %, based on the first component,
   and a second component K2 comprising a water-dispersible, isocyanate-based crosslinker.

2. The water-based primer composition as claimed in claim 1, wherein the epoxy resin in the first component K1 has an epoxy equivalent weight of at least 1400 g/eq.

3. The water-based primer composition as claimed in claim 1, wherein the epoxy resin content of the first component K1 is 17 to 35 wt %.

4. The water-based primer composition as claimed in claim 1, wherein the polyacrylate in the first component K1 is a hydroxy-functional polyacrylate.

5. The water-based primer composition as claimed in claim 4, wherein the hydroxy-functional polyacrylate has a hydroxyl number of 125 or more.

6. The water-based primer composition as claimed in claim 1, wherein the weight ratio of the epoxy resin to the sum total of the weight fraction of the polyester-polyurethane and of the polyacrylate is in the range from about 1.15:1 to 5:1.

7. The water-based primer composition as claimed in claim 1, wherein the weight ratio of the polyester-polyurethane to the polyacrylate is in the range from about 2:1 to 1:1.

8. The water-based primer composition as claimed in claim 1, wherein the first component K1 comprises isopropanol as water-miscible organic solvent.

9. The water-based primer composition as claimed in claim 1, wherein the water-dispersible, isocyanate-based crosslinker is in the form of a prepolymer of polyols and aliphatic polyisocyanates.

10. The water-based primer composition as claimed in claim 9, wherein hexamethylene diisocyanate or isophorone diisocyanate are incorporated as aliphatic polyisocyanates into the prepolymer.

11. The water-based primer composition as claimed in claim 1, wherein the second component K2 is incorporated in an amount of 5 to 10 wt %, based on the total weight of the first component.

12. A method for treating a substrate S1, comprising the steps of
  i) mixing the components of a water-based primer composition as claimed in claim 1,
  ii) applying the mixed composition to a substrate S1, and
  iii) allowing the applied composition to dry.

13. A method for adhesively bonding two substrates S1 and S2, the substrate S1 being a plastics substrate, comprising the steps of
  i) mixing the components of a water-based primer composition as claimed in claim 1,
  ii) applying the mixed composition to a first substrate S1,
  iii) allowing the applied composition to dry,
  iv) applying an adhesive to the dried composition, and
  v) contacting the adhesive-coated substrate S1 with a second substrate S2.

14. The method as claimed in claim 13, wherein the adhesive is a polyurethane adhesive.

15. A method comprising applying a mixed primer composition to a plastics substrate, the mixed primer composition comprising a water-based primer composition as claimed in claim 1 as primer for the adhesive bonding of plastics substrates, with plasticizer-containing polyurethane adhesives.

* * * * *